US009232002B1

(12) United States Patent
Sorenson, III (10) Patent No.: US 9,232,002 B1
(45) Date of Patent: Jan. 5, 2016

(54) MIGRATING CONNECTION FLOWS

(75) Inventor: James Christopher Sorenson, III, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 977 days.

(21) Appl. No.: 13/337,945

(22) Filed: Dec. 27, 2011

(51) Int. Cl.
*G06F 11/00* (2006.01)
*H04L 29/08* (2006.01)
*H04L 29/14* (2006.01)

(52) U.S. Cl.
CPC ............ *H04L 67/1034* (2013.01); *H04L 69/40* (2013.01)

(58) Field of Classification Search
CPC ............ H04L 67/1002; H04L 67/1008; H04L 67/1034; H04L 67/14; H04L 69/40
USPC .................................. 709/224, 226; 714/4.11
See application file for complete search history.

(56) References Cited

U.S. PATENT DOCUMENTS

| 5,774,660 | A  | * | 6/1998  | Brendel et al. | 709/201 |
| 8,244,864 | B1 | * | 8/2012  | Bahl et al.    | 709/225 |
| 2004/0093416 | A1 | * | 5/2004  | Thomas      | 709/227 |
| 2005/0086342 | A1 | * | 4/2005  | Burt et al. | 709/224 |
| 2005/0267970 | A1 | * | 12/2005 | Sugizaki    | 709/225 |
| 2007/0005603 | A1 | * | 1/2007  | Jain et al. | 707/10  |
| 2007/0078961 | A1 | * | 4/2007  | Kumano et al. | 709/223 |
| 2008/0059639 | A1 | * | 3/2008  | Zhang       | 709/227 |
| 2009/0245113 | A1 | * | 10/2009 | Kamiya      | 370/238 |

* cited by examiner

*Primary Examiner* — David Lazaro
(74) *Attorney, Agent, or Firm* — Hogan Lovells US LLP (57) ABSTRACT

In a cluster network, an ingress component can serve as an entry point for incoming request traffic and route requests to a plurality of backend servers for processing. Each of the backend servers can handle multiple flows (e.g., TCP) established with the ingress component. When a backend server is detected to have been overloaded with requests, a different peer server is selected on the network to take over processing of the requests from the overloaded server. A set of state information for at least one connection is then transferred from the overloaded server to the selected peer server. Thereafter, the ingress component can update its routing information to begin routing new incoming requests or packets for that connection to the new peer server. The state information can be transferred upon reaching a logical boundary between requests, or within a request, received on the connection.

26 Claims, 5 Drawing Sheets

MIGRATING CONNECTION FLOWS

BACKGROUND

Transmission Control Protocol (TCP) and Internet Protocol (IP) are some of the most commonly used communication protocols in the Internet protocol suite. Often referred to as TCP/IP, protocols such as these define ways of communicating between entities over the Internet as well as various other networks.

A TCP connection represents an end point for communicating to another entity over the network. For example, when one server or application wants to communicate some information over the network to another, a handshake process is typically performed to establish a TCP connection, and subsequently, that TCP connection is used to send data between the two entities. The TCP connection takes care of the details of breaking up a large chunk of data and transmitting the individual IP packets on behalf of the sender, such that the sender only needs to issue a single request to the TCP in order to transmit the entire set of information.

Distributed load balancers are used in computer networking to distribute workload across multiple computers. This is often done in order to achieve optimal resource utilization, maximize throughput and avoid overload. In the context of a cluster network that serves client requests, a load balancer would typically receive a request from a client and relay it to a particular server in the cluster that will process that request and often issue a response. Load balancers frequently try to distribute the request load evenly across all of the servers in an effort to prevent any individual server in the cluster from being overloaded with requests. In certain instances, however, servers in the cluster may nonetheless become overloaded with request traffic, causing various latencies, errors, dropped requests and TCP connection problems or other issues.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches to communications across a network. In particular, various embodiments provide approaches to load balancing and the transferring of request traffic between servers or other such components on the network.

In a conventional cluster network scenario, a distributed load balancer (or an ingress server) uses packet forwarding to send inbound traffic to particular hosts, each of which handle multiple flows. There are cases when the ingress servers will overwhelm a single host for various reasons. When this happens, it is possible, via the embodiments described herein, to take an existing flow and move the flow (and potentially any address or other aspects relevant to an endpoint of the flow) to a new and/or less-loaded server to continue processing subsequent requests. Flows might be moved for various other purposes as well, such as to move long-lived connections to enable maintenance to be performed on a server, to adjust or compensate for network partitioning, or to address asymmetric routing issues, among others.

In accordance with an embodiment, several functions are performed in order to make it possible to transfer the flow from one server (host) to another. The state of the current flow is transferred from the source host to the destination host, and the ingress component routing the request is informed that the traffic has shifted to a new host in order to route new request traffic to the new host.

In accordance with an embodiment, the transfer occurs at request boundaries in a Transmission Control Protocol (TCP) flow. Hypertext transfer protocol (HTTP) pipelining allows multiple requests to be sent over a single TCP connection, and as such, the state can be transferred at a point in time when one request has been finished, and the next request on the same connection has yet to be processed.

In accordance with an embodiment, the overloaded server can recognize that the server is overloaded and choose a peer host to continue processing requests from the connection. Various techniques can be implemented for detecting an overloaded server and for selecting a server are known in the art and can be implemented with the techniques described herein. The overloaded server will then gather state about the connection, (e.g. TCP window acknowledgments, all unacknowledged transmit data; all received acknowledged data that has yet to be delivered to the local application, etc) and forward that information to the selected peer. Once the peer has accepted the state data for the TCP flow, one of the servers will then inform the ingress component to forward all future packets for that flow to the newly chosen peer. While the transfer is taking place, the overloaded server can drop all received packets so that the state of the connection can be transferred. Once the transfer is completed, TCP retries will enable the flows to continue as though nothing happened.

It should be noted that while many examples in this disclosure are described with reference to TCP, the various embodiments are not all limited to TCP or other single protocol. For example, certain alternative embodiments can utilize user datagram protocol (UDP), stream control transmission protocol (SCTP) or various other communication rules and protocols.

Figure 1:
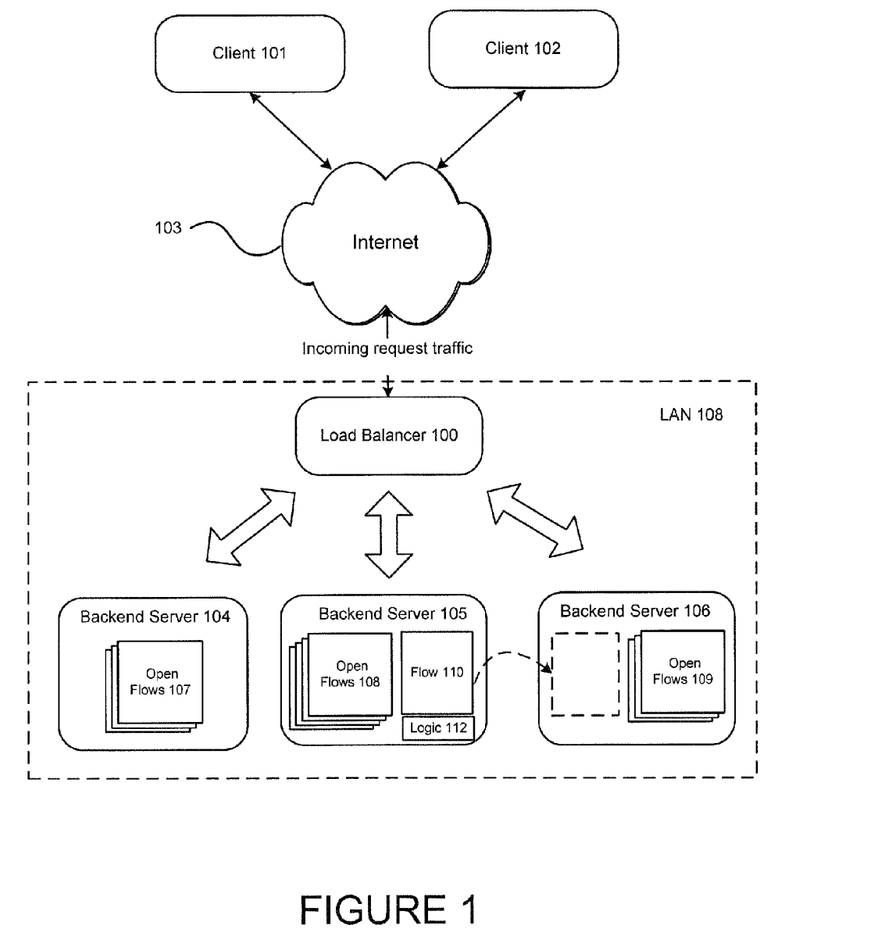
FIG. 1 illustrates an example situation where a server transfers its flow to a peer server in the local network, in accordance with various embodiments.

FIG. 1 illustrates an example environment where a server transfers its flow (here, a TCP flow) to a peer server in the local network, in accordance with various embodiments. As illustrated, a load balancer 100 is typically used as an entry point for requests being received to the local area network (LAN) 108 from various clients (101, 102) on the Internet 103 in order to distribute and balance the work load evenly across all of the available backend servers (104, 105, 106) that process the incoming requests. The load balancer uses packet forwarding to send inbound traffic to these backend servers, each of which handle multiple TCP flows (107, 108, 109) simultaneously.

While load balancers often succeed in distributing the load evenly, there are certain situations where one or more load balancers can overload a particular backend server with requests. This may occur for a variety of reasons, such as too many clients trying to connect to the network, load distribution techniques being ineffective for the particular situation at hand or any other scenarios where a server receives more requests than the server can process in a reasonable time period.

When this occurs, a system described herein can recognize that a particular backend server 105 has become overloaded, select a peer server 106 to take over processing a portion of the requests from the overloaded server and transfer one or more of the TCP flows 110 from the overloaded server to the selected peer server. In some embodiments, the selected peer server might be an additional backend server that is brought online to handle additional load, or for other such purposes, and is able to accept one or more of the flows from the overloaded server. An overloaded server might include selection logic 112 enabling the server to select one or more peer servers to receive the flows as well as which flows to transfer. Once the TCP flow has been transferred, the load balancer 100 is informed that the traffic has shifted to the new host 106 in order to route new request traffic for that TCP flow to the new host.

As previously noted, a variety of techniques for recognizing an overloaded server or application are known in the art and can be utilized in conjunction with the embodiments described herein. For example, the overloaded server can be detected by the load balancer periodically pinging the backend servers for their current load and detecting that a load on a particular server has exceeded a specified threshold. Alternatively, the backend server can itself detect that it has become overloaded with requests and initiate the steps to transfer the TCP flow(s). Moreover, a number of techniques for selecting a peer server are well known in the art and can be utilized in conjunction with the embodiments therein. For example, a backend server can be selected that currently has the lightest request load or one that is expected to have lighter request loads in the near future can be selected to take over the open TCP flow(s) from the overloaded server. Alternatively, a backend server can be selected in a random fashion to take over the load from the overloaded server. It will be apparent to one of ordinary skill in the art that any of these or other methodologies can be utilized with the embodiments described in the present disclosure.

Figure 2:
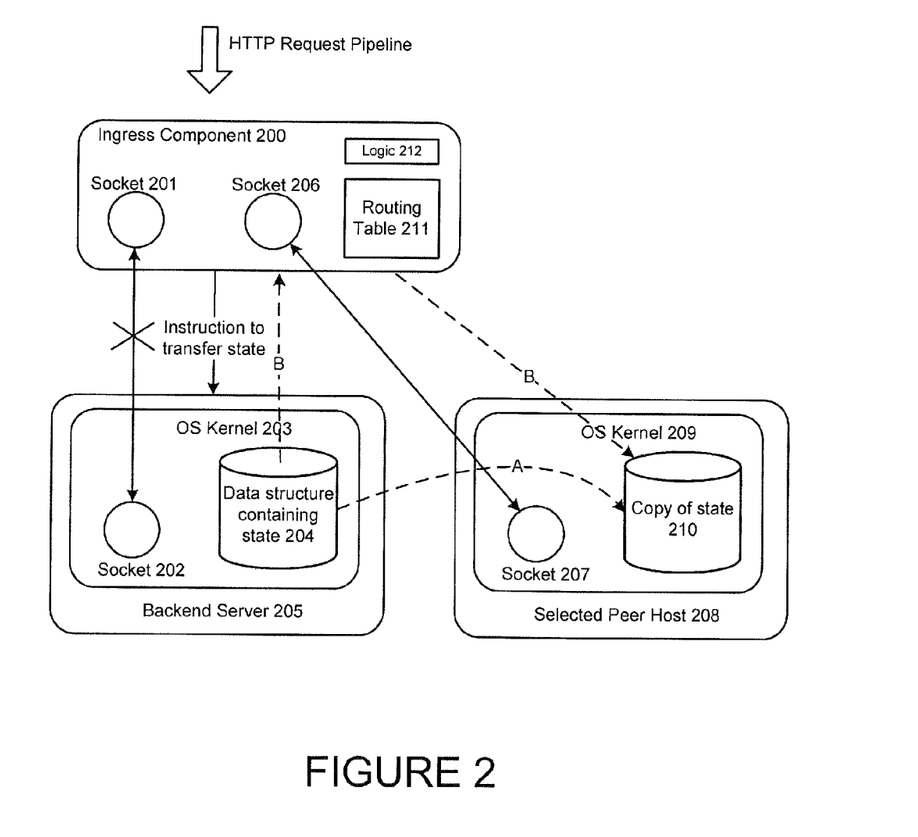
FIG. 2 illustrates an example situation where a server transfers its flow to a peer server in the local network, in accordance with various embodiments.

FIG. 2 illustrates an example situation where a server utilizing an operating system (OS), such as the Linux® OS, transfers its TCP flow to a peer server in the local network, in accordance with various embodiments. It is noted, however, that while examples described throughout this disclosure may refer to specific operating system environments, the various embodiment are not limited to any particular type of operating system or device unless otherwise stated, and any component illustrated herein that may be OS-specific is shown purely for purposes of illustration. Further, while TCP is used as an example protocol, other protocols such as the User Datagram Protocol (UDP) can be used as well within the scope of the various embodiments.

As illustrated in FIG. 2, an ingress component 200 (e.g., an ingress server, egress server, load balancer, router, or other component containing logic and configured to manage connections and/or determine how packets arrive at a backend server) can have a number of open TCP sockets (201, 206) to the various backend servers, as well as a routing table 211 (or other data structure) that contains information about which incoming requests should be routed to which server. Similarly, the backend servers can have the appropriate TCP sockets (202, 207) open on the backend to enable TCP flow to and from the ingress component 200.

When one server 205 is detected to have been overloaded, the ingress component can send a message to that server, instructing it to transfer a portion (or all) of its TCP flows to another server in the group of managed servers (e.g., a cluster or other logically connected group of computing resources). In this particular illustration, backend server 208 is selected to take over processing from the overloaded server 205. It is noted that the selection of the peer host can be done by the overloaded server 205 itself or by the ingress component 200. Similarly, the determination that an overload has occurred can be made at the ingress component 200 or at the overloaded server 205 itself.

Once the overloaded server receives the instruction from the ingress component, it can initiate the transfer of certain TCP flows to the peer server 208. In accordance with an embodiment, this is performed by server 205 bundling up the state associated with the TCP socket into a message and transferring the message to server 208 either (A) directly or (B) by relaying that information to the ingress component which can in turn provide it to server 208. The selection of specific flows can be made at random or according to any appropriate selection criteria, such as may include the most expensive flows from a processing standpoint, long-running flows, flows for specific tasks or types of customer, etc. One or more of the servers can contain logic 212 for selecting the flows to transfer. If the server operating system utilizes OS kernels, for example, each kernel (203, 209) can contain a data structure 204 containing the state information for the TCP socket. In accordance with various embodiments, the state information to be transferred can include but is not limited to (1) unacknowledged transmit data designated to be sent to the client; (2) data received from the client that has not been processed yet by the overloaded backend server; (3) acknowledgement counter and sequence numbers to be sent to the client; and (4) port numbers and IP addresses that uniquely identify the TCP socket. This state information can be bundled up into a message that is forwarded to server 208 which has been selected to take over processing of that particular TCP flow from the overloaded server. Once the peer server has 208 a copy of the TCP state information 210, it can take over processing the request flow on that particular TCP flow. All of this can happen transparently from the perspective of the client which originally sent the request, such that the client does not need to perform anything out of the ordinary to continue about its functions.

In accordance with an embodiment, the transfer of the TCP flow occurs at a reasonable stopping point in the flow of data packets from the ingress component to the overloaded server. If the entire image has not yet finished transferring to the overloaded server, it may not make sense to transfer the TCP flow to the new server because it would not have all the necessary information to take over processing the request. As such, it can make sense to determine a logical boundary between requests and only transfer the TCP flow upon reaching that boundary.

In the context of an HTTP pipeline, the logical boundary can be determined by the logic 212 of the ingress component (or the overloaded server itself) based on the HTTP header information of the incoming requests. An HTTP header normally contains a number of fields, including a "content-length" field which specifies the length of the message body of the HTTP request. In some embodiments, the ingress component can buffer data that arrives after the boundary and then forward the data to the selected host 208 when the connection is migrated. This content length field can be used to determine whether the entire body of the request has been received by the overloaded server before initiating transfer of the TCP state. The overloaded server can thus wait until the entire body of the HTTP message has been received and only then safely forward the TCP flow to the selected peer server. In other words, the state can be transferred in the time period when one request has been finished and the next request on the same connection is yet to be received. It is noted that the HTTP header information is only one of several possible methods of determining a logical boundary for transferring the TCP flow and not all embodiments described herein are limited to this particular technique.

Figure 3:
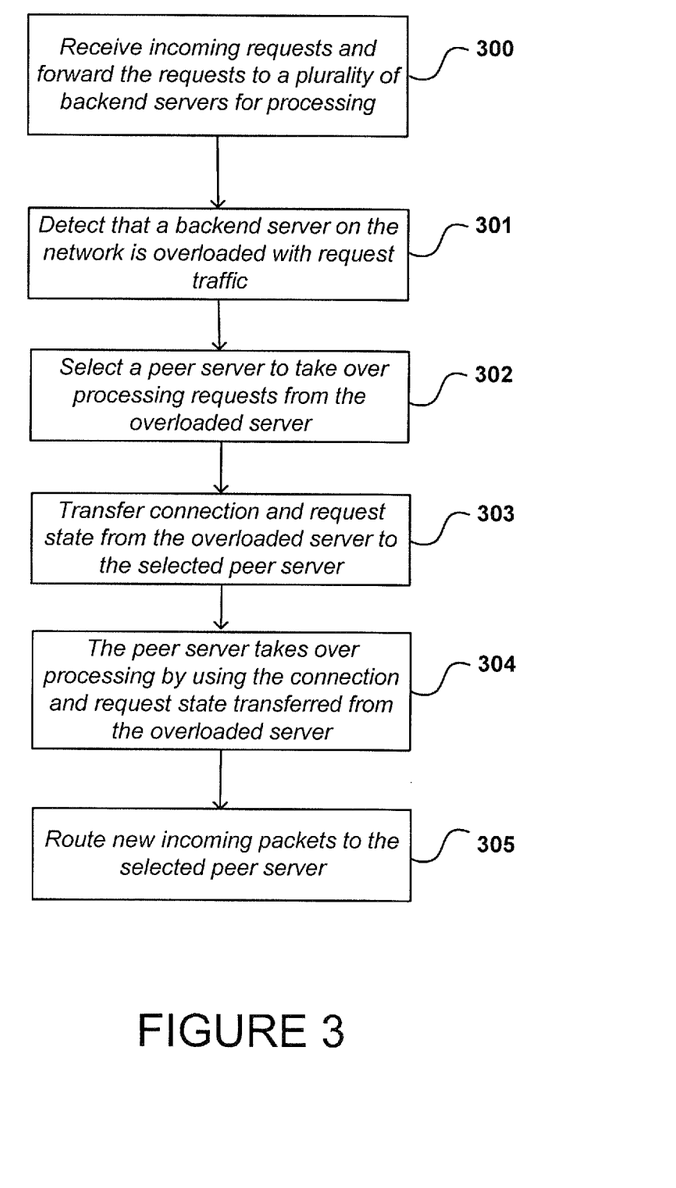
FIG. 3 illustrates an example process for transferring flow from a server that can be used in accordance with various embodiments.

FIG. 3 illustrates an example process for transferring TCP flow from an overloaded server that can be used in accordance with various embodiments.

As shown in step 300, a load balancer (or ingress component) can continue receiving incoming requests and forwarding the requests to a plurality of backend servers for processing. Under normal conditions, the backend servers each handle a number of TCP flows over which they receive and process the requests and issue responses to the client.

In step 301, it can be detected that a particular backend server has become overloaded with requests. This determination can be made by an ingress component or by the overloaded server itself. In one specific embodiment, the overloaded server can determine this by monitoring the amount of available RAM that can be used for connections and determine that the available amount is below a specified threshold or other such metric. Once the system goes into an overload condition, another peer server in the cluster can be selected to take over processing of one or more TCP flows from the overloaded server, as shown in step 302. The selection of the peer server can be performed by the ingress component or by the overloaded server itself.

In step 303, the TCP connection state and state information about the request, where appropriate, is transferred from the overloaded server to the selected peer server. In one example, a flow might be transferring data for a movie and the state information can be used to determine a location in the requested data from which to resume once the flow is transferred. In accordance with an embodiment, the TCP connection state should be transferred upon reaching a reasonable stopping point, such as a boundary between requests flowing to the overloaded server or a logical transfer point between data packets of a flow. The logical point might be any appropriate point, such as between chapters of a movie being transferred, but not during the middle of a security negotiation or other process that would be hindered by the transfer. The TCP state can be transmitted in a message directly from the overloaded server to the selected peer server, or alternatively, the overloaded server can first send the TCP state to the ingress component, which can in turn forward it to the selected peer.

Once the peer server has received the TCP state information, the peer server can take over processing of the requests flowing on that TCP flow from the overloaded server, as shown in step 304. In accordance with an embodiment, the peer server can employ the received TCP state to finish processing the requests and to continue receiving future requests for that TCP flow from the ingress component. This can be performed by updating the routing information at the ingress component, so that it can begin forwarding the new incoming requests, or additional incoming packets, for the TCP flow to the new peer server, as shown in step 305.

Figure 4:
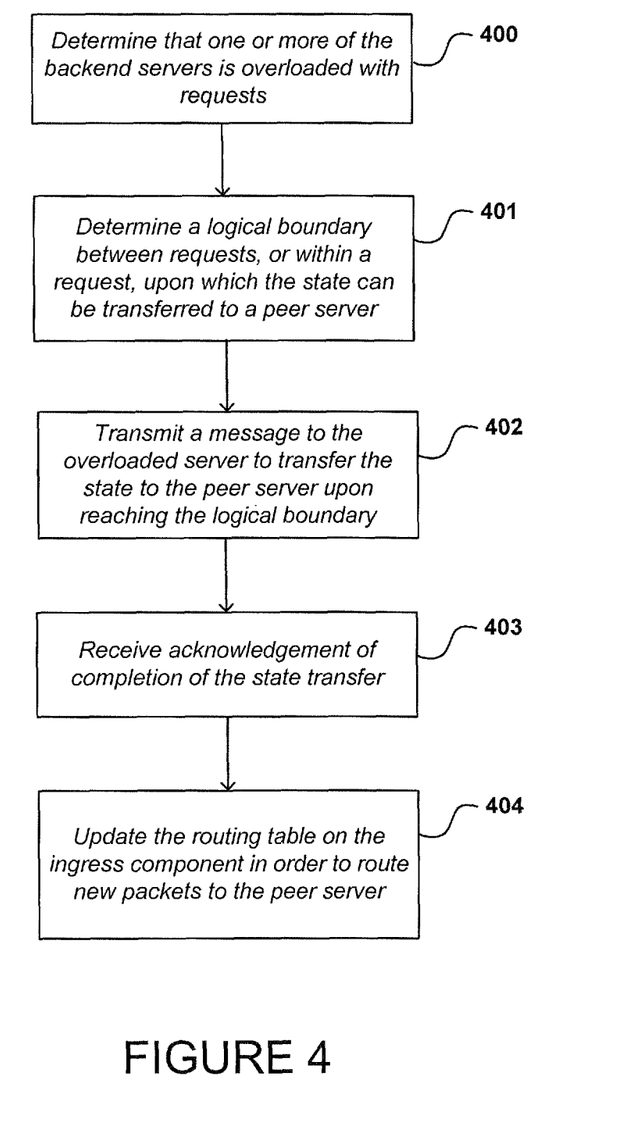
FIG. 4 illustrates an example process performed by an ingress component that can be used in accordance with various embodiments.

FIG. 4 illustrates an example process performed by an ingress component that can be used in accordance with various embodiments. It should be noted, however, that the various functions illustrated in this figure are restricted to be performed at the ingress component and can be performed by other entities, such as the overloaded server itself. The illustrated sequence is just one of the many possible implementations of the various embodiments described herein.

As shown in step 400, the ingress component can determine that one of the backend servers is overloaded with requests. In step 401, the ingress component can determine a logical boundary between the requests, or between packets within a request, flowing to the overloaded server. In accordance with an embodiment, the boundary can be determined by inspecting a content length field of the HTTP header in the HTTP request pipeline and waiting until the entire body of the HTTP request has been received by overloaded server before the boundary is considered to be reached. Various other boundary determinations can be used as well as discussed and suggested elsewhere herein.

In step 402, upon reaching the request boundary, the ingress component can transmit a message to the overloaded server, instructing it to forward the TCP flow to a selected peer server that will take over the request processing from the overloaded server. Once the ingress component receives an acknowledgement from the overloaded server that the TCP state has been transferred to the peer host, (step 403), the ingress component can route all new requests and/or packets for that TCP flow to the new peer host. In accordance with an embodiment, this can be performed by updating the routing table at the ingress component, to route the requests from IP addresses associated with the TCP connection to the new host, as shown in step 404.

Figure 5:
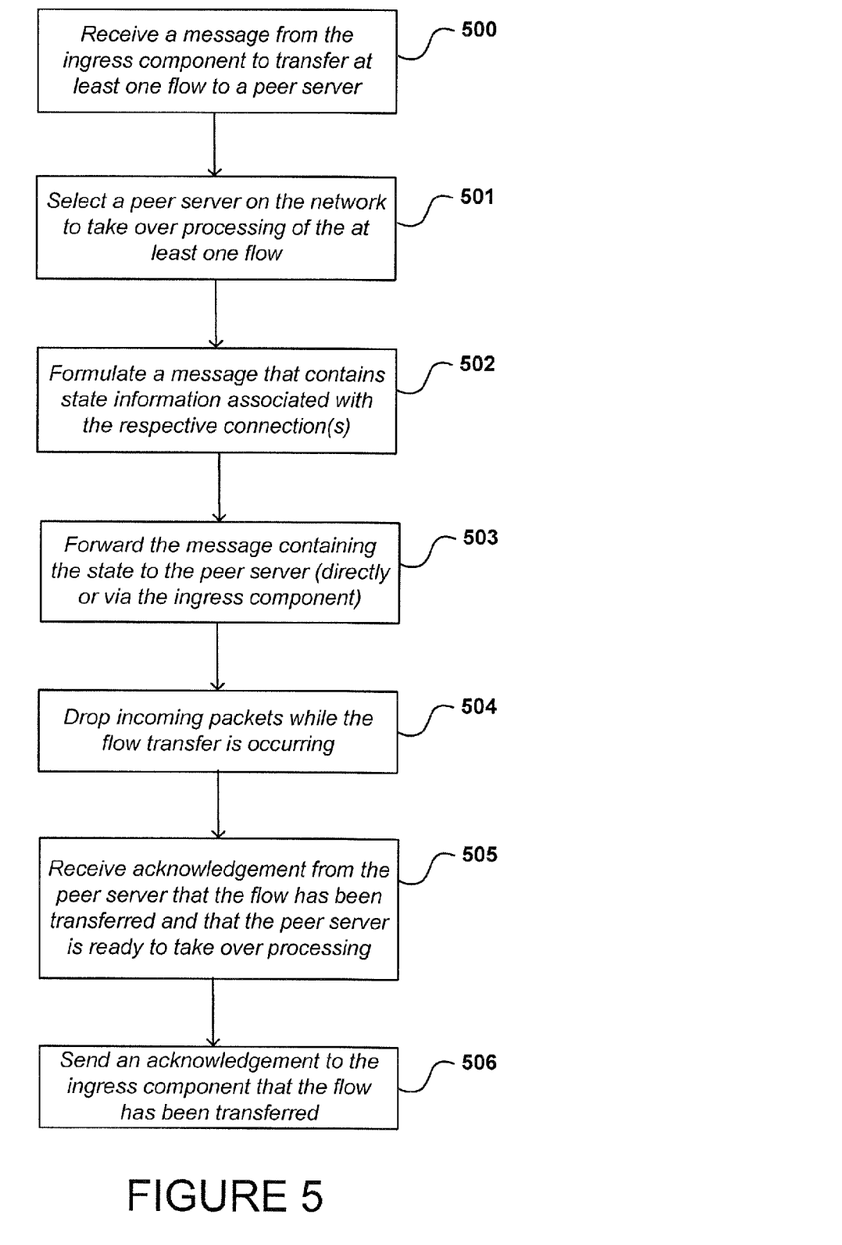
FIG. 5 illustrates an example process performed by an overloaded server that can be used in accordance with various embodiments.

FIG. 5 illustrates an example process performed by the overloaded server that can be used in accordance with various embodiments. Similarly to the process illustrated in FIG. 4, the various functions illustrated in this figure are not restricted to being performed at the overloaded server and can alternatively be performed by other entities, such as the ingress component or other such components on the network. The illustrated sequence is just one of the many possible implementations of the various embodiments described herein.

As illustrated in step 500, the overloaded server can receive a message from the ingress component, instructing the overloaded server to transfer the state for the TCP connection and/or a pending request to another server. In step 501, the overloaded server selects a peer server in the cluster to take over processing of the requests and/or packets flowing on that TCP connection. In step 502, the overloaded server formulates a message that contains all the state information necessary for the selected peer server to take over processing of requests or packets for the TCP flow uninterrupted by the transition. In step 503, the message containing the state is forwarded to the peer server. This can be done by the overloaded server directly transmitting the message to the peer server or by first sending the message to another component (e.g. the ingress component) and the other component providing the state information to the peer server. When the transfer of state is taking place, the overloaded server can stop processing any requests on the TCP connection being transferred (step 504). In step 505, the overloaded server can receive an acknowledgement that the peer server has received the TCP connection state and is ready to take over processing requests and packets on that connection. In step 506, the overloaded server can send an acknowledgement or confirmation to the ingress component, indicating that the state for the TCP connection has been successfully transferred and that it is safe to begin routing new requests and/or packets associated with that connection to the new peer server.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments described or suggested herein utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for moving connections from a computing device, said method comprising:
   establishing a plurality of transmission control protocol (TCP) connections between an ingress component and a plurality of backend servers;
   receiving, by said ingress component, a plurality of requests from a client and forwarding the requests from the ingress component to the plurality of backend servers over the plurality of TCP connections;
   detecting that a first backend server of the plurality of backend servers has been overloaded by processing at least a portion of the forwarded requests;
   selecting a second backend server from the plurality of backend servers to take over processing from said first backend server;
   causing a set of state information associated with at least one TCP connection that was established on the first backend server to be transferred to the second backend server, wherein the set of state information includes at least an acknowledgement counter and a sequence number to be sent to the client; and routing, to the second backend server, subsequent requests associated with said at least one TCP connection received by the ingress component from the client.

2. The computer-implemented method of claim 1, wherein transferring the set of state information further comprises:
determining a logical boundary between a plurality of requests, or within a request, being processed by the first backend server and transferring said set of state information to the second backend server upon having reached said logical boundary.

3. The computer-implemented method of claim 1, wherein the set of state information includes one or more of unacknowledged transmit data designated to be sent to the client, data received from the client that has not been processed yet by the first backend server, or port numbers and IP addresses that uniquely identify the TCP connection.

4. The computer-implemented method of claim 1, further comprising:
establishing a TCP connection on the second backend server based on the set of state information received from the first backend server and receiving said new requests on the TCP connection on the second backend server.

5. A computer-implemented method, comprising:
selecting a first server that has been routed an amount of request traffic;
selecting a second server capable of processing at least a portion of the amount of request traffic;
causing a set of state information associated with at least one connection previously established on the first server to be transferred to the second server, wherein the set of state information includes at least an acknowledgement counter and a sequence number to be sent to the client; and
causing the second server to process the request traffic for the at least one transferred connection on the second server using the state information obtained from the first server.

6. The computer-implemented method of claim 5, wherein selecting the second server includes selecting a server that is currently able to process at least a portion of the amount of request traffic or activating an additional server for handing at least a portion of the request traffic.

7. The computer-implemented method of claim 5, further comprising:
selecting at least one connection to be transferred to the second server based at least in part upon at least one of a random selection process, a processing time for the at least one connection, a transfer time of the at least one connection, a remaining time of the at least one connection, a maintenance requirement, or a type of the at least one connection.

8. The computer-implemented method of claim 5, further comprising:
determining a logical boundary between a plurality of requests, or within a request, in said request traffic being processed by the first server and transferring said set of state information to the second server upon having reached said logical boundary.

9. The computer-implemented method of claim 5, further comprising:
updating routing information to start routing new incoming request traffic associated with said connection to the second server.

10. The computer-implemented method of claim 5, wherein the connection is a Transport Control Protocol (TCP) connection and wherein the state information includes one or more of unacknowledged transmit data designated to be sent to a client, data received from the client that has not been processed yet by the first server, or port numbers and IP addresses that uniquely identify the TCP connection.

11. The computer implemented method of claim 5, wherein transferring the set of state information associated with the connection on the first server further comprises:
transmitting the set of state information from the first server to an ingress component on the cluster; and
transmitting the set of state information from the ingress component to the second server.

12. The computer-implemented method of claim 5, wherein detecting that the first server has been overloaded with the request traffic further comprises:
transmitting a message from an ingress component on the cluster to the first server, said message instructing the first server to transfer the state information associated with the connection to the second server.

13. The computer-implemented method of claim 12, wherein the header of the HTTP request is used to determine a logical boundary after which the first server transfers the state information to the second server.

14. The computer-implemented method of claim 5, wherein the first server includes a Linux operating system having a socket kernel buffer that stores said state information associated with the connection, and wherein the information stored in the socket kernel buffer is transmitted to the second server.

15. The computer-implemented method of claim 5, wherein the request traffic is a Hypertext Transfer Protocol (HTTP) pipeline that includes a plurality of HTTP requests, each said HTTP request including a header and a message body, said header including a content length element that indicates a length of the message body.

16. A computing device, comprising:
a processor; and
memory including instructions that, when executed by the processor, cause the computing device to:
select at least one connection to be transferred from the computing device;
select at least one peer server to receive the at least one connection;
transfer, to the peer server, a set of state information associated with at least one connection previously established on the computing device, wherein the set of state information includes at least an acknowledgement counter and a sequence number to be sent to the computing device; and
cause the second server to process packets for the at least one transferred connection using the state information obtained from the computing device.

17. The computing device of claim 16, wherein the at least one connection to be transferred from the computing device is performed in response to receiving an instruction from an ingress component to transfer the at least one connection.

18. The computing device of claim 16, further comprising:
determining to transfer the at least one connection in response to determining that the computing device has a current load that is greater than a specified load threshold.

19. The computing device of claim 16, further comprising:
selecting at least one connection to be transferred to the peer server based at least in part upon at least one of a random selection process, a processing time for the at least one connection, a transfer time of the at least one connection, a remaining time of the at least one connection, a maintenance requirement, or a type of the at least one connection.

20. The computing device of claim 16, wherein transferring the set of state information further includes determining a logical boundary between a plurality of requests in said request traffic being processed by the first server and transferring said set of state information to the second server upon having reached said logical boundary.

21. A system for processing requests, comprising:
a first server configured to process requests received on at least one first connection;
a second server configured to process requests received on at least one second connection; and
an ingress component configured to establish the first and second connections with the first and second servers and selectively route request traffic along the first and second connections, the ingress component further configured to cause a set of state information associated with at least one first connection previously established on the first server to be transferred to the second server, the ingress component further configured to cause the second server to process the request traffic for the at least one transferred connection on the second server using the state information obtained from the first server, wherein the state information includes at least an acknowledgement counter and a sequence number.

22. The system of claim 21, wherein the ingress component is further configured to select the second server from a plurality of servers, the ingress component selecting one of the plurality of servers that is currently able to process at least a portion of the amount of request traffic or activating an additional server for handing at least a portion of the request traffic.

23. The system of claim 21, wherein the ingress component is further configured to select at least one connection to be transferred to the second server based at least in part upon at least one of a random selection process, a processing time for the at least one connection, a transfer time of the at least one connection, a remaining time of the at least one connection, a maintenance requirement, or a type of the at least one connection.

24. A non-transitory computer readable storage medium storing a set of instructions, the instructions when executed by one or more hardware processors, causing the one or more hardware processors to perform a set of steps comprising:
selecting a first server that has been routed an amount of request traffic;
selecting a second server capable of processing at least a portion of the amount of request traffic;
causing a set of state information associated with at least one connection previously established on the first server to be transferred to the second server, wherein the state information includes at least an acknowledgement counter and a sequence number; and
causing the second server to process the request traffic for the at least one transferred connection on the second server using the state information obtained from the first server.

25. The non-transitory computer readable storage medium of claim 24, further comprising instructions for:
determining a logical boundary between a plurality of requests, or within a request, in said request traffic being processed by the first server and transferring said set of state information to the second server upon having reached said logical boundary.

26. The non-transitory computer readable storage medium of claim 24, further comprising instructions for:
updating routing information on an ingress component on the cluster to start routing new incoming request traffic associated with said connection to the second server.

\* \* \* \* \*